United States Patent
Kawai (10) Patent No.: US 7,674,217 B2
(45) Date of Patent: Mar. 9, 2010

(54) MACHINE TOOL WITH SPINDLE CHUCK REPLACING MECHANISM

(75) Inventor: Hidetsugu Kawai, Inuyama (JP)

(73) Assignee: Murata Machinery, Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 12/425,564

(22) Filed: Apr. 17, 2009

(65) Prior Publication Data

US 2009/0275452 A1 Nov. 5, 2009

(30) Foreign Application Priority Data

Apr. 30, 2008  (JP) ............... 2008-118600

(51) Int. Cl.
  *B23Q 3/155*  (2006.01)
  *B23B 31/00*  (2006.01)
(52) U.S. Cl. ................ 483/20; 279/901; 82/129; 82/124; 82/142; 29/38 B; 74/813 R; 74/825
(58) Field of Classification Search .......... 483/20, 483/19, 17, 14, 901; 82/129, 124, 125, 142; 279/901, 900; 29/38 B, 38 R; 74/813 R, 74/825, 826

See application file for complete search history.

(56) References Cited

U.S. PATENT DOCUMENTS 3,762,035 A * 10/1973 Ledergerber et al. ........ 29/38 B
3,779,110 A * 12/1973 Harman et al. ............. 483/20
4,019,410 A * 4/1977 Staszkiewicz .............. 82/124
4,563,925 A    1/1986 Link

FOREIGN PATENT DOCUMENTS

| JP | 58-196904 A  | 11/1983 |
| JP | 2001-232564 A | 8/2001 |
| JP | 2001-341001 A | 12/2001 |

\* cited by examiner

*Primary Examiner*—Erica E Cadugan
(74) *Attorney, Agent, or Firm*—Westerman, Hattori, Daniels & Adrian, LLP (57) ABSTRACT

The present invention provides a machine tool with a spindle chuck replacing mechanism which is simply configured to enable a reduction in time for work replacement without the need to sense the rotation speed of a spindle chuck or the like. The machine tool includes a pre-rotation-transmission mechanism 7 transmits rotation of a spindle motor 4, via a path different from a chuck coupling portion 3a of a spindle 3, to a spindle chuck 5 placed in a processing position P1 and not coupled the chuck coupling portion 3a. The pre-rotation-transmission mechanism 7 makes a difference in rotation speed between the spindle chuck 5 and the spindle 3. The pre-rotation-transmission mechanism 7 has a speed difference absorbing mechanism 23 that absorbs the difference in rotation speed with the spindle chuck 5 coupled to the chuck coupling portion 3a.

3 Claims, 6 Drawing Sheets

MACHINE TOOL WITH SPINDLE CHUCK REPLACING MECHANISM

FIELD OF THE INVENTION

The present invention relates to a machine tool such as a lathe which includes a spindle chuck replacing mechanism, and for example, to a technique for installing and removing a work without the need to stop a spindle motor.

BACKGROUND OF THE INVENTION

In a machine tool such as a lathe, a processed work gripped by a spindle chuck is replaced with a new one by a loader or the like. In this case, rotation of a spindle is stopped, and the processed work is received by the loader. The loader then passes a new work to the spindle chuck. Thereafter, the spindle motor is rotated to actuate and accelerate the rotation of the spindle up to a speed required for processing. Thus, replacement of the work on the spindle chuck involves time required to decelerate and stop the rotation of the spindle, time required to deliver the work, and time required to properly rotate the spindle. The time required for work replacement increases the cycle time of processing. In particular, when processing with a tool in contact with the work requires only a short time, the time required for work replacement accounts for most of the cycle time.

A lathe enabling a reduction in the time required for work replacement has been proposed (for example, the Unexamined Japanese Patent Application Publication (Tokkai-Sho) No. 58-196904). In the lathe, two spindles are provided so as to be switchably placed in a processing position and in a standby position. While the spindle in the processing position is processing a work, the work on the spindle in the standby position is replaced with a new one. In this case, one spindle motor is used to drive the spindles and transmits power to the spindle in the processing position.

Another lathe has been proposed which has a fixed spindle and a plurality of spindle chucks that can be installed on and removed from the tip of the spindle. To attach any of the spindle chucks to the spindle during rotation, the lathe uses a dedicated motor that rotates the spindle chuck, and a spindle motor that rotationally drives the spindle. The lathe synchronously controls the rotation speeds of the dedicated motor and the spindle motor.

In the proposed example in which two spindles are rotated by the common spindle motor, the processing time can be utilized to receive the processed work from the spindle chuck and to deliver a new work to the spindle chuck. However, the acceleration of the rotation of the spindle up to the appropriate speed needs to be performed after the spindle in the standby position has reached the processing position. This prevents a reduction in the time required to accelerate the rotation of the spindle up to the appropriate speed and included in the work replacement time.

The lathe synchronously controlling the rotation speeds of the dedicated motor and the spindle motor needs to use two motors and to achieve the synchronous control during high-speed rotation. Furthermore, phase control is required to place the two motors in positions where the motors can be coupled together. Thus, the need for the plurality of motors increases the manufacturing costs of the machine tool as well as the size of the machine tool as a whole. Furthermore, the rotation speeds of the two motors need to be subjected to both synchronous control and phase control during high speed rotation. This complicates the control system and increases an arithmetic processing load on the control device.

SUMMARY OF THE INVENTION

An object of the present invention is to provide a machine tool with a spindle chuck replacing mechanism which is simply configured to enable a reduction in time for work replacement without the need to sense the rotation speed of a spindle chuck or the like.

Another object of the present invention is to provide a machine tool with a spindle chuck replacing mechanism which enables rotation of a spindle motor to be extracted from a rear part of a spindle.

Yet another object of the present invention is to provide a machine tool with a spindle chuck replacing mechanism which enables a reduction in required components and manufacturing costs.

A machine tool with a spindle chuck replacing mechanism according to the present invention comprises a spindle having a chuck coupling portion at a tip thereof and rotationally driven by a spindle motor, a plurality of spindle chucks each capable of holding a work, the spindle chucks being selectively engageable with the chuck coupling portion of the spindle so as to be disengageable from the chuck coupling portion, a spindle chuck replacing mechanism rotatably supporting the plurality of spindle chucks and freely transferring any of the spindle chucks between a processing position where the spindle chuck is positioned in front of the spindle and a work replacement position where the work on the spindle chuck is replaced with a new one, the spindle chuck replacing mechanism coupling and decoupling the spindle chuck in the processing position to and from the chuck coupling portion of the spindle, and a pre-rotation-transmission mechanism transmitting rotation of the spindle motor, via a path different from the chuck coupling portion of the spindle, to the spindle chuck located in the processing position and not coupled to the chuck coupling portion of the spindle. The pre-rotation-transmission mechanism makes a difference in rotation speed between the spindle chuck and the spindle and has a speed difference absorbing mechanism absorbing the difference in rotation speed with the spindle chuck coupled to the chuck coupling portion of the spindle.

According to this configuration, after the work is processed, the spindle chuck coupled to the chuck coupling portion of the spindle is decoupled from the chuck coupling portion by the spindle chuck replacing mechanism. Then, the spindle chuck placed in the work replacement position and holding the work to be processed is transferred to the processing position by the spindle chuck replacing mechanism. Thereafter, the spindle chuck in the processing position, not coupled to the chuck coupling portion, is rotationally driven by the spindle motor via the pre-rotation-transmission mechanism. Then, the spindle chuck replacing mechanism couples the spindle chuck in the processing position to the chuck coupling portion. At this time, the pre-rotation-transmission mechanism makes a slight difference in rotation speed between the spindle chuck and the spindle. Even with a difference in phase between the spindle chuck in the processing position and the chuck coupling portion, the difference in rotation speed makes the spindle chuck and the chuck coupling portion in phase to enable coupling. Thus, the spindle chuck and the spindle are reliably coupled together. With the spindle chuck and the spindle coupled together, the speed difference absorbing mechanism absorbs the difference in rotation speed. After the spindle chuck is coupled to the spindle, the rotation transmission by the pre-rotation-transmission mechanism is turned off. Thereafter, the work held on the spindle chuck in the processing position is processed. The above-described operation is subsequently repeated.

As described above, any of the spindle chucks can be coupled to the chuck coupling portion without the need to stop the rotation of the spindle, the acceleration and deceleration of which requires a long time. In this case, the spindle chuck can be reliably coupled to the chuck coupling portion using the simple configuration without the need to sense the rotation speed of the spindle chuck or the like. According to the present machine tool, when the works is replaced with a new one for processing, the processing can be immediately started. This enables a reduction in processing cycle time. The machine tool also eliminates the need to synchronously control motors during high-speed rotation. This also prevents the control system from being complicated. The machine tool obviates the need for motors dedicated to the respective spindle chucks. This enables a reduction in the manufacturing costs of the machine tool and in the size of the machine tool as a whole.

The pre-rotation-transmission mechanism may extract the rotation from a rear part of the spindle. Thus, since the rotation of the spindle motor can be extracted from the rear part of the spindle, a processing space can be provided in front of the spindle.

The pre-rotation-transmission mechanism may have a driving shaft, a driving gear provided on the driving shaft, and a plurality of driven gears each meshing with the driving gear to transmit rotation to each spindle chuck rotatably supported on the spindle chuck replacing mechanism, and the plurality of driven gears may be intentionally misaligned in an axial direction and are selectively meshed with the driving gear by the coupling and decoupling operation of the spindle chuck replacing mechanism.

In this case, a structure can be provided in which the rotation is prevented from being transmitted to the spindle chuck in the work replacement position. This enables the work to be replaced with a new one. Furthermore, the operation of coupling and decoupling the spindle chuck can be utilized to switchably enable and cancel the transmission of the rotation to the spindle chuck. This allows a reduction in required components and manufacturing costs.

The machine tool with the spindle chuck replacing mechanism according to the present invention comprises the spindle having the chuck coupling portion at the tip thereof and rotationally driven by the spindle motor, the plurality of spindle chucks each capable of holding the work, the spindle chucks being selectively engageable with the chuck coupling portion of the spindle so as to be disengageable from the chuck coupling portion, the spindle chuck replacing mechanism rotatably supporting the plurality of spindle chucks and freely transferring any of the spindle chucks between the processing position where the spindle chuck is positioned in front of the spindle and the work replacement position where the work on the spindle chuck is replaced with a new one, the spindle chuck replacing mechanism coupling and decoupling the spindle chuck in the processing position to and from the chuck coupling portion of the spindle, and the pre-rotation-transmission mechanism transmitting rotation of the spindle motor, via the path different from the chuck coupling portion of the spindle, to the spindle chuck located in the processing position and not coupled to the chuck coupling portion of the spindle. The pre-rotation-transmission mechanism makes a difference in rotation speed between the spindle chuck and the spindle, and has the speed difference absorbing mechanism absorbing the difference in rotation speed with the spindle chuck coupled to the chuck coupling portion of the spindle. Thus, the time for work replacement can be reduced using the simple configuration without the need to sense the rotation speed of the spindle chuck or the like.

The pre-rotation-transmission mechanism may extract the rotation from the rear part of the spindle.

The pre-rotation-transmission mechanism may have the driving shaft, the driving gear provided on the driving shaft, and the plurality of driven gears each meshing with the driving gear to transmit rotation to each spindle chuck rotatably supported on the spindle chuck replacing mechanism, and the plurality of driven gears may be intentionally misaligned in the axial direction and are selectively meshed with the driving gear by the coupling and decoupling operation of the spindle chuck replacing mechanism. This allows a reduction in required components and manufacturing costs.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

A first embodiment of the present invention will be described with reference to FIGS. 1 to 5. The following will be sequentially described: the general configuration of a machine tool as a whole according to the first embodiment, the periphery of a spindle, a spindle chuck, a spindle chuck replacing mechanism, a pre-rotation-transmission mechanism, and the like.

Figure 1:
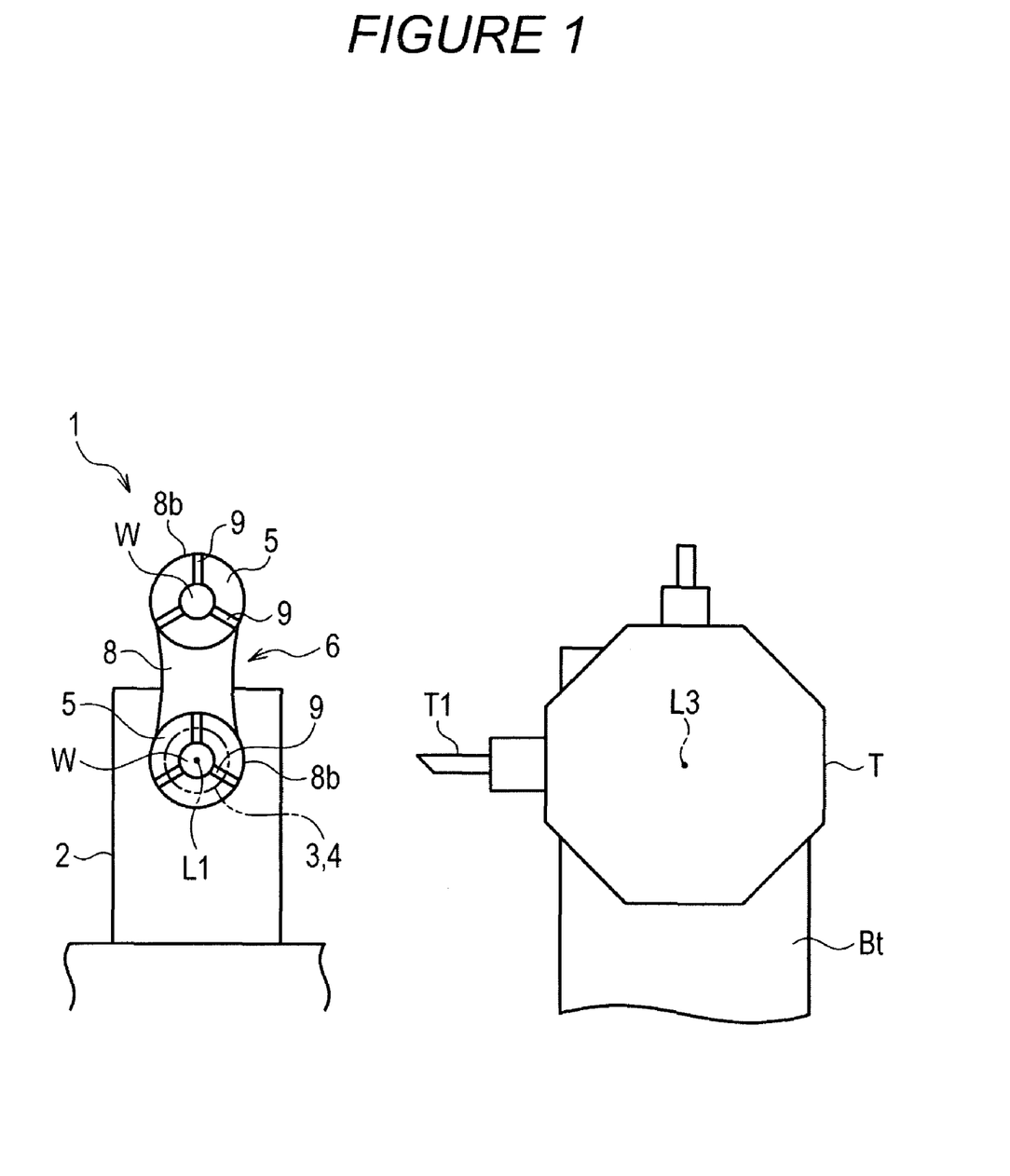
FIG. 1 is a front view of a machine tool with a spindle chuck replacing mechanism according to a first embodiment of the present invention.

As shown in FIG. 1, a machine tool 1 with a spindle chuck replacing mechanism is a turret type lathe and has a spindle support member 2, a spindle 3, a spindle motor 4, two spindle chucks 5, 5, a spindle chuck replacing mechanism 6, a pre-rotation-transmission mechanism 7 (FIG. 2), and a tool rest T.

The periphery of the spindle will be described.

Figure 2:
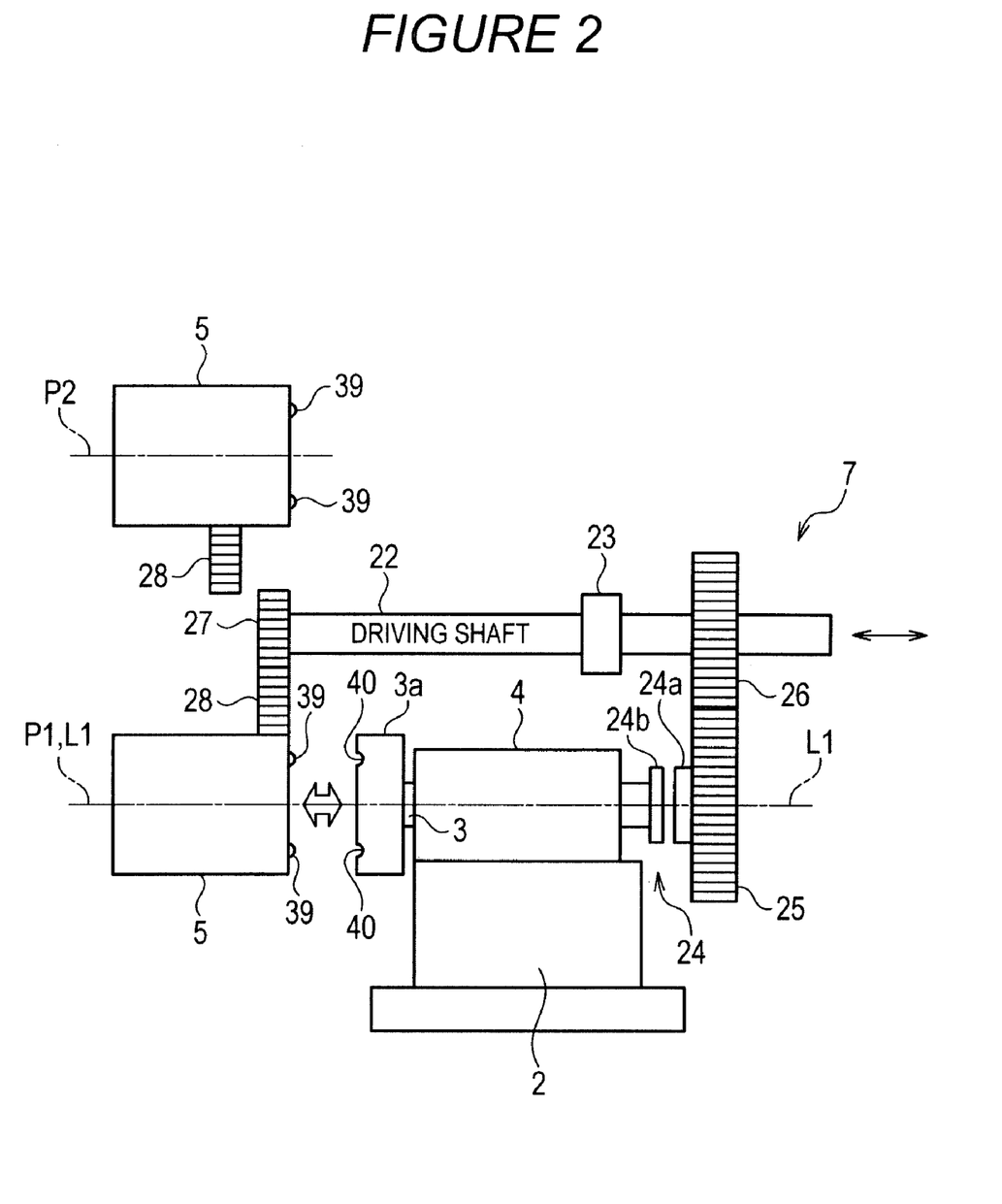
FIG. 2 is a side view schematically showing a pre-rotation-transmission mechanism and the like of the machine tool.
Figure 3:
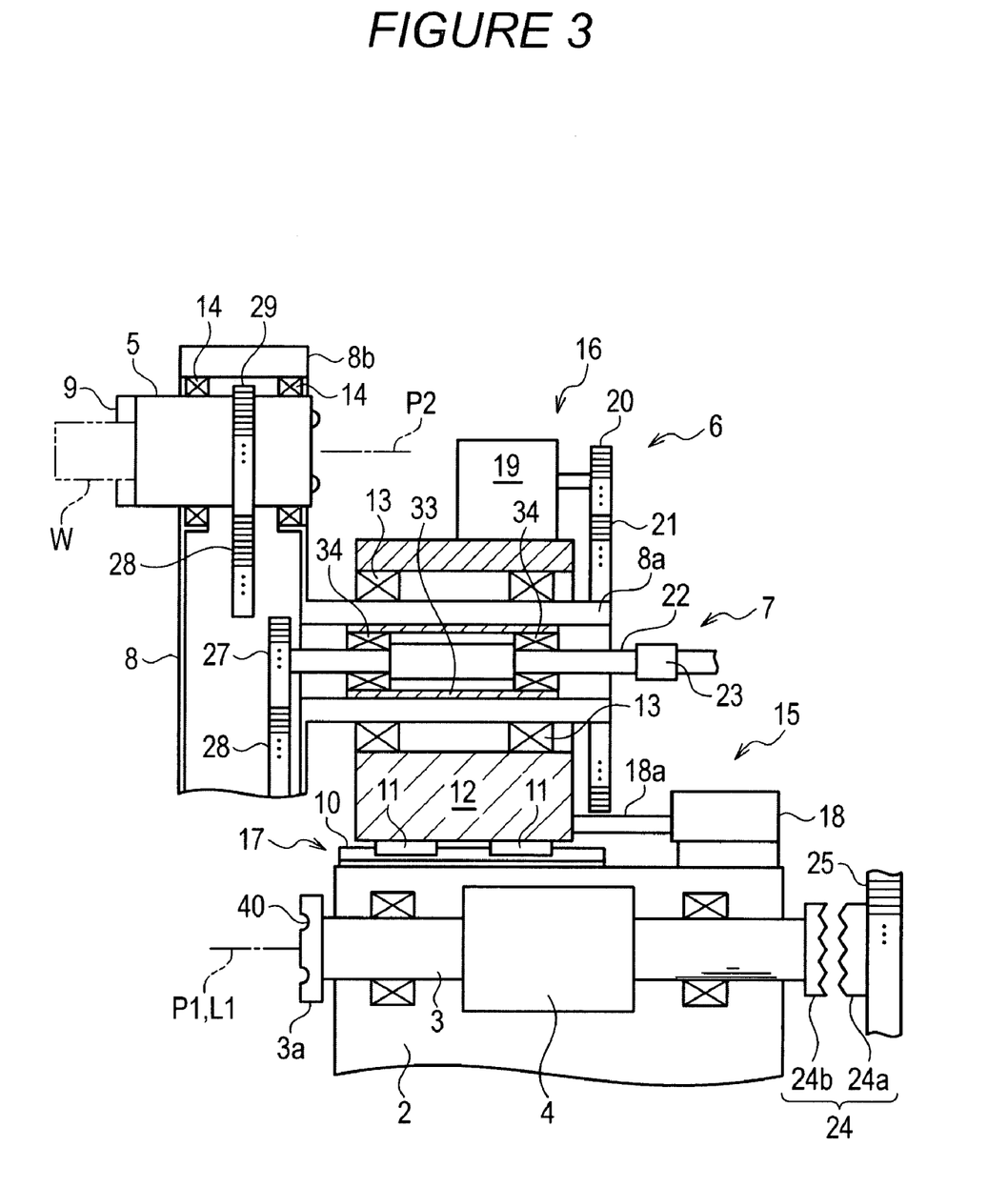
FIG. 3 is a sectional view showing the spindle chuck replacing mechanism and the like of the machine tool.

As shown in FIGS. 1 to 3, the spindle support member 2 is composed of a spindle head provided on a bed (not shown in the drawings). The spindle 3 is supported on the spindle support member 2 by a spindle bearing so as to be rotatable around an axis L1. As shown in FIGS. 2 and 3, the spindle 3 has a chuck coupling portion 3a at an axial tip thereof with which two spindle chucks 5, 5 can be selectively engaged so as to be disengageable from the chuck coupling portion 3a. The spindle motor 4 is provided inside the spindle support member 2 to rotationally drive the spindle 3. The spindle motor 4 may be provided outside the spindle support member 2 to transmit rotation to the spindle 3 via a belt or the like.

As shown in FIG. 1, the tool rest T is composed of a turret. The tool rest T is located on a slide Bt so as to be indexably rotatable around an axis L3 parallel to the spindle 3. The slide Bt is moved to move the tool rest T in a front-back direction and in a lateral direction. A tool T1 attached to the tool rest T is used to process a work W held on the spindle chuck 5 coupled to the chuck coupling portion 3a. The tool T1 is attached to each of tool stations circumferentially arranged around the outer periphery of the tool rest T. Each tool T1 may be a fixed tool such as a cutting tool or a rotating tool such as a milling head or a drill. Furthermore, the tool rest T is indexably rotated by indexation driving means (not shown in the drawings).

The spindle chuck 5 will be described.

As shown in FIGS. 1 and 3, the two spindle chucks 5, 5 are provided on a turning arm 8 at a predetermined distance from each other so as not to interfere with each other. The spindle chucks 5, 5 are further arranged parallel to each other. Each of the spindle chucks 5 has, for example, a chuck pawl 9 and provides the function of displacing the chuck pawl 9 inward and outward in a radial direction to hold the work W. The "spindle chuck" need not have full specifications for the spindle which are required to exert a strong gripping force but includes a jig-like spindle chuck that only temporarily grips the spindle.

The spindle chuck replacing mechanism 6 will be described.

The spindle chuck replacing mechanism 6 rotatably supports the plurality of spindle chucks 5. The spindle chuck replacing mechanism 6 can transfer any of the spindle chucks 5 between a processing position P1 where the spindle chuck 5 is positioned in front of the spindle 3 and a work replacement position where the work W on the spindle chuck 5 is replaced with a new one. The spindle chuck replacing mechanism 6 further couples and decouples the spindle chuck 5 in the processing position P1 to and from the chuck coupling portion 3a of the spindle 3.

As shown in FIG. 3, the spindle chuck replacing mechanism 6 has a coupling mechanism 15 and a turning mechanism 16 including a turning arm 8. The turning arm 8 is turnable and is movable in an axial direction to enable the operation of coupling and decoupling the spindle chuck 5 to and from the chuck coupling portion 3a of the spindle 3.

The tuning arm 8 and a support means therefore will be described.

A slide rail 10 is laid at the top of the spindle support member 2. A casing 12 is provided via a direct-acting bearing 11 guided along the slide rail 10. A shaft portion 8a of the turning arm 8 is rotatably supported via a plurality of bearings 13, 13. The front and rear ends of the turning arm 8 project from the casing 12. The front end of the turning arm 8 includes turning portions 8b, 8b projecting from the center of the shaft portion 8a to opposite positions in the radial direction, that is, to positions that are symmetric through 180 degrees. In each of the turning portions 8b, the spindle chuck 5 is rotatably supported via a plurality of bearings 14, 14.

The coupling mechanism 15 couples and decouples the spindle chuck 5 in the processing position P1 to and from the chuck coupling portion 3a of the spindle 3. The turning mechanism 16 turns the turning arm 8 to transfer any of the spindle chucks 5 between the processing position P1, where the spindle chuck 5 is positioned in front of the spindle 3, and the work replacement position P2. The work replacement position P2 is synonymous with the position where the work W on the spindle chuck 5 is replaced with a new one.

The coupling mechanism 15 has the casing 12, a slide mechanism 17, and a front-back driving source 18. The slide mechanism 17 has the direct-acting bearing 11 and the slide rail 10. The slide rail 10 is laid at the top of the spindle support portion 2. A plurality of direct-acting bearings 11 are fastened to the bottom of the casing 12. The direct-acting bearings 11 are guided along the slide rail 10 to allow the casing 12 to move in the axial direction of the spindle. The spindle support member 2 includes the front-back driving source 18 composed of, for example, a fluid pressure cylinder. A rod 18a of the fluid pressure cylinder is provided parallel to the longitudinal direction of the slide rail 10. The tip of the rod 18a is coupled to the lower part of the casing 12. The front-back driving source 18 is driven to move the casing 12 in the axial direction of the spindle, that is, forward and backward. Then, the spindle chuck 5 in the processing position P1 is coupled to and decoupled from the chuck coupling portion 3a of the spindle 3. Instead of the fluid pressure cylinder, a motor and a ball screw are applicable.

The turning mechanism 16 has a turning arm 8, a bearing 13, a turning driving motor 19, and a power transmitting portion. The shaft portion 8a of the turning arm 8 is rotatably supported in the casing 12 via the plurality of bearings 13, 13. A turning driving motor 19 is provided above the casing 12. The turning driving motor 19 provides driving to rotate the shaft portion 8a forward and backward around the axis thereof via the power transmitting portion. The turning portions 8b, 8b can thus be rotated through 180 degrees.

The power transmitting portion has a pinion gear 20 fastened to a motor shaft of the turning driving motor 19 and a gear 21 provided around the outer periphery of the rear end of the shaft portion 8a so as to mesh with a pinion gear 20. Thus, the turning driving motor 19 provides driving to transmit power from the pinion gear 20 to the gear 21 to rotate the shaft portion 8a through 180 degrees via the plurality of bearings 13, 13. Consequently, any of the two spindle chucks 5, 5 provided in the turning portions 8b, 8b are placed in the processing position P1 or the work replacement position P2.

The pre-rotation-transmission mechanism 7 will be described.

Figure 4:
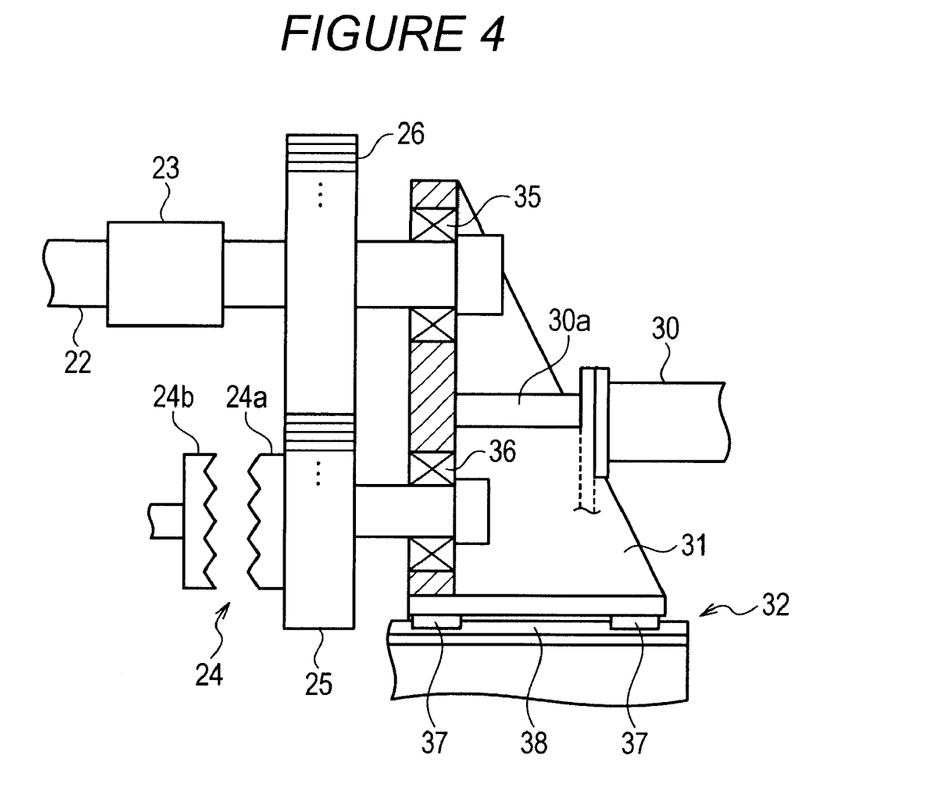
FIG. 4 is a partly enlarged sectional view of the pre-rotation-transmission mechanism of the machine tool.

As shown in FIGS. 2 to 4, the pre-rotation-transmission mechanism 7 transmits the rotation of the spindle motor 4 via a path different from the chuck coupling portion 3a.

As shown in FIGS. 2 and 3, the pre-rotation-transmission mechanism 7 has a driving shaft 22, a speed difference absorbing mechanism 23, a clutch 24, a clutch gear 25, an input gear 26, a driving gear 27, driven gears 28, 28, and output gears 29, 29. As shown in FIG. 4, the pre-rotation-transmission mechanism 7 has a fluid pressure cylinder 30, a slide member 31, a slide mechanism 32, and a liner member 33 (shown in FIG. 3).

As shown in FIG. 3, a part of the driving shaft 22 is inserted through the shaft portion 8a and the turning portion 8b. That is, the cylindrical liner member 33 is provided so as to be slidable forward and backward on the inner cylindrical surface of the shaft portion 8a. A plurality of bearings 34, 34 spaced from each other in the front-back direction are provided on the inner diameter surface of the liner member 33. Furthermore, as shown in FIG. 4, the slide member 31 is provided in the machine tool main body via the slide mechanism 32 so as to be movable in the front-back direction. A bearing 35 for the driving shaft 22 and a bearing 36 for supporting the clutch gear 25 are fitted into the slide member 31. As shown in FIGS. 3 and 4, the driving shaft 22 is fitted into one of the bearings 35, 36 which is used for the driving shaft 22, that is, the bearing 35, and into the bearings 34, 34, provided in the liner member 33. The driving shaft 22 is rotatably supported.

The driving gear 27 is fastened to the tip of the driving shaft 22. The plurality of (in the present example, two) driven gears 28, 28 are can be meshed with the driving gear 27. The two driven gears 28, 28 are rotatably supported in the respective turning portions 8b, 8b at opposite positions in the radial direction which are at a predetermined distance from each other. Furthermore, the driven gears 28, 28 are intentionally misaligned in the axial direction. In conjunction with the coupling and decoupling operation of the spindle chuck replacing mechanism 6, the rod 30a of the fluid pressure cylinder 30 is moved forward and backward. Then, the two driven gears 28, 28 selectively mesh with the driving gear 27. The output gear 29 is provided on the outer peripheral surface of each of the spindle chucks 5. The output shaft 29 always meshes with the driven gears 28.

As shown in FIG. 4, the fluid pressure cylinder 30 is provided in the machine tool main body. The rod 30a of the fluid pressure cylinder 30 is coupled to the slide member 31. The slide mechanism 32 has a direct-acting bearing 37 and a slide rail 38. A plurality of the direct-acting bearings 37 are fastened to the bottom surface of the slide member 31. The slide rail 38 is laid in the machine tool main body. The plurality of direct-acting bearings 37 are guided along the slide rail 38. Thus, rod 30a of the fluid pressure cylinder 30 is moved forward and backward to move the slide member 31 and the liner member 33 forward and backward. Then, the driving gear 27 can be meshed with the desired driven gear 28.

As shown in FIG. 2, the rotation ratio for the set of the clutch gear 25 and the input gear 26 is slightly different from that for the set of the driving gear 27, the driven gear 28, and the output gear 29 (FIG. 3). The rotation ratios can be changed by adjusting the number of teeth in each of the gears. Thus, when rotation can be transmitted to the spindle chuck 5 via a path different from the chuck coupling portion 3a, a difference in rotation speed can be made between the spindle chuck 5 and the spindle 3.

For example, while the spindle is rotating at 1,000 rpm, the spindle chuck 5 can be rotated at 1,001 rpm or 999 rpm. However, the difference in rotation speed is not limited to this value.

The speed difference absorbing mechanism 23 is provided, for example, in the vicinity of an intermediate part of the driving shaft 22 in the longitudinal direction. With the spindle chuck 5 coupled to the chuck coupling portion 3a of the spindle 3 so that rotation can be transmitted to the spindle chuck 5 via the path different from the chuck coupling portion 3a, the speed difference absorbing mechanism 23 absorbs the difference in rotation speed. The rotation speed absorbing mechanism 23 is composed of, for example, a fluid coupling, a differential gear, or a coil spring.

As the clutch 24, any of various clutches, for example, a jaw clutch, a gear clutch, a friction clutch, and an electromagnetic clutch, is applicable. One side 24a of the clutch 24 is provided on one end surface of the clutch gear 25. The other side 24b of the clutch 24, which meshes with the one side 24a of the clutch, is provided at the end of an output shaft extended from the rear part of the spindle 3. As shown in FIGS. 2 and 4, the fluid pressure 30 provides driving to mesh the driving gear 27 with the desired driven gear 28. Thereafter, the opposite sides of the clutch 24 are meshed with each other. Thus, the pre-rotation-transmission mechanism 7 can transmit the rotation of the spindle motor 4 to the spindle chuck 5 via the path different from the chuck coupling portion 3a.

The relationship between the spindle chuck 5 and the chuck coupling portion 3a will be described.

Figure 5:
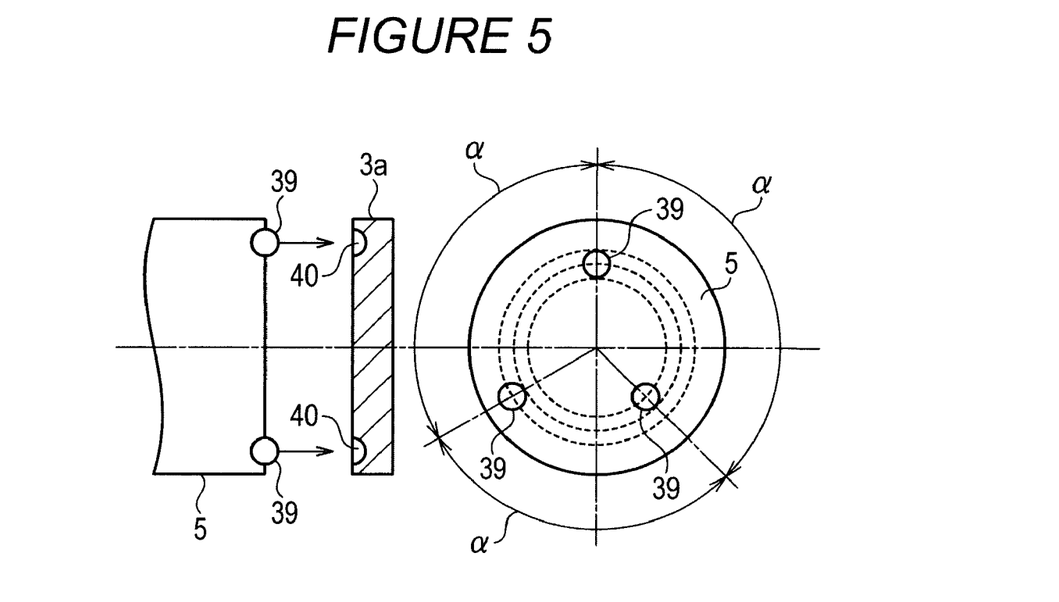
FIG. 5 is a diagram showing the relationship between a spindle chuck and a chuck coupling portion of the machine tool.

As shown in the left half of FIG. 5, a plurality of (in the present example, three) semispherical protruding portions 39 are provided at the rear end of each of the spindle chucks 5, which lies opposite the chuck coupling portion 3a. As shown in the right half of FIG. 5, the protruding portions 39 are arranged, for example, at equal intervals $\alpha$ ($\alpha$=120 degrees) in the circumferential direction. The protruding portions 39 are further disposed at different positions in the radial direction. As shown in the left half of FIG. 5, recess portions 40 are formed in the chuck coupling portion 3a of the spindle 3 so as to be engageable with the corresponding protruding portions 39. The plurality of protruding portions 39 are each made up of a semispherical surface of the same size. However, varying the radial disposition position of the protruding portion 39 enables each of the protruding portions 39 to engage only with the corresponding one of the recess portions 40. With the spindle 3 and the spindle chuck 5 rotating, when the spindle chuck 5 engages with the chuck coupling portion 3a of the spindle 3, the difference in rotation speed between the spindle chuck 5 and the spindle 3 allows the phases of the spindle chuck 5 and the spindle 3 to be matched with each other. Thus, the recess portions 40 engage reliably with the corresponding protruding portions 39.

The operation of the above-described configuration will be described.

After the work W is processed, the front-back driving source 18 provides driving to decouple the spindle chuck 5 coupled to the chuck coupling portion 3a in the processing position P1. Then, the turning driving motor 19 provides driving to transfer the spindle chuck in the work replacement position P2 to the processing position P1, the spindle chuck holding the work W to be processed. After or simultaneously with the transfer, the fluid pressure cylinder 30 provides driving to mesh the driving gear 27 with the desired driven gear 28. Moreover, the opposite sides of the clutch 24 are meshed with each other. Thus, the pre-rotation-transmission mechanism 7 can transmit the rotation. Thereafter, the spindle chuck 5 placed in the processing position P1 and not coupled to the chuck coupling portion 3a is rotationally driven by the spindle motor via the pre-rotation-transmission mechanism 7.

Then, the front-back driving source 18 provides driving to couple the spindle chuck 5 in the processing position P1 to the chuck coupling portion 3a. At this time, the pre-rotation-transmission mechanism 7 makes a difference in rotation speed between the spindle chuck 5 and the spindle 3. The difference in rotation speed allows the phases of the spindle chuck 5 in the processing position P1 and the chuck coupling portion 3a to be matched with each other. The recess portions 40 then engage with the corresponding protruding portions 39. In this coupled state, the speed difference absorbing mechanism 23 absorbs the difference in rotation speed. After the coupling of the spindle chuck 5, the fluid pressure cylinder 30 provides driving to disconnect the opposite sides of the clutch 24 from each other. The rotation transmission by the pre-rotation-transmission mechanism 7 is thus turned off. Whether or not the spindle chuck 5 is coupled to the chuck coupling portion 3a can be determined based on detection of variation in the load on the spindle motor 4, what is called variation in spindle load. However, the determination is not limited to this aspect. Thereafter, the work W held on the spindle chuck 5 in the processing position P1 is processed. The above-described operation is subsequently repeated.

According to the machine tool with the spindle chuck replacing mechanism described above, any of the spindle chucks 5 can be coupled to the chuck coupling portion 3a of the spindle 3 without the need to stop the rotation of the spindle 3, the acceleration and deceleration of which requires a long time. In this case, the spindle chuck 5 can be reliably coupled to the chuck coupling portion 3a using the simple configuration without the need to sense the rotation speed of the spindle chuck 5 or the like. According to the present machine tool, when the works W is replaced with a new one for processing, the processing can be immediately started. This enables a reduction in processing cycle time. The machine tool also eliminates the need to synchronously control motors during high-speed rotation. This prevents the control system from being complicated. The machine tool obviates the need for motors dedicated to the respective spindle chucks. This enables a reduction in the manufacturing costs of the machine tool and in the size of the machine tool as a whole.

The pre-rotation-transmission mechanism 7 extracts the rotation from the rear part of the spindle 3. Thus, since the rotation of the spindle motor 4 can be extracted from the rear part of the spindle 3, a processing space can be provided in front of the spindle 3.

The two driven gears 28, 28 are intentionally misaligned in the axial direction and are selectively meshed with the driving gear 27 by the coupling and decoupling operation of the spindle chuck replacing mechanism 6. This arranged exerts the following effects. A structure can be provided in which the rotation is prevented from being transmitted to the spindle chuck 5 in the work replacement position P2. This enables the work to be replaced with a new one. Furthermore, the operation of coupling and decoupling the spindle chuck 5 can be utilized to switchably enable and cancel the transmission of the rotation to the spindle chuck 5. This allows a reduction in required components and manufacturing costs.

The single spindle motor 4 can be used to rotate each of the spindle chucks 5 before coupling the spindle chuck 5 to the chuck coupling portion 3a, without the need for dedicated motors for rotating the respective spindle chucks 5. Furthermore, a difference in rotation speed can be easily made between the spindle chuck 5 and the spindle 3 simply by changing the gear ratio of for example, the driven gear 28, which meshes with the driving gear 27. This obviates the need for a complicated mechanism making the difference in rotation speed. This enables a reduction in required components and manufacturing costs.

Now, other embodiments of the present invention will be described.

In the description below, components corresponding to the matters described in the first embodiment are denoted by the same reference numerals. Duplicate descriptions may be omitted. When only a part of an arrangement is described below, the remaining part of the arrangement is similar to that described in the first embodiment. Not only the components specifically described in each of the embodiments may be combined together but also the embodiments may be partly combined together unless the combination poses a particular problem.

Figure 6:
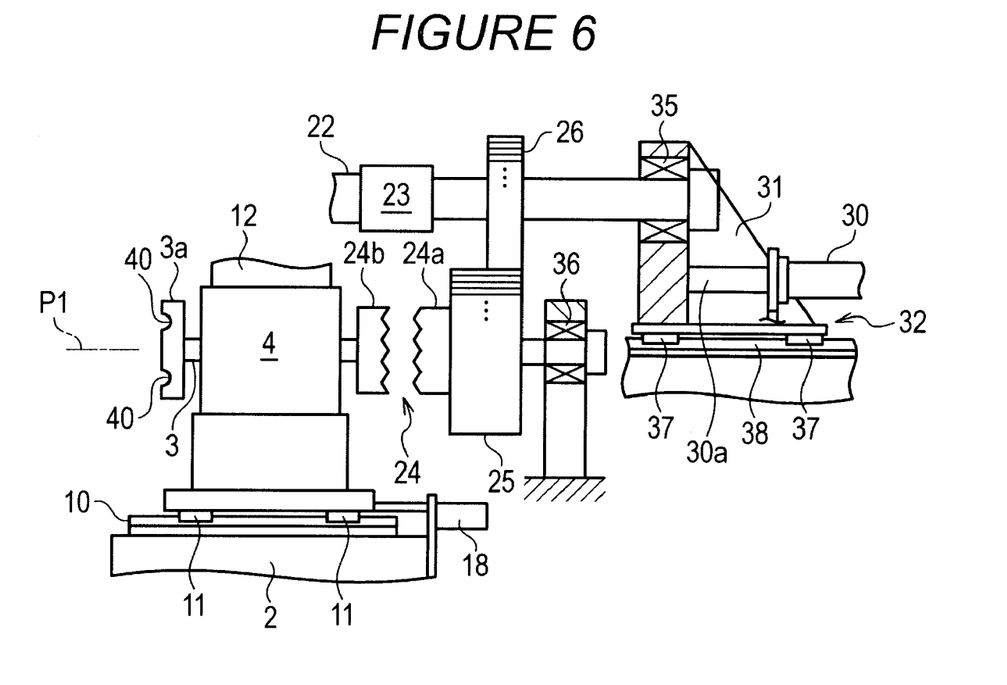
FIG. 6 is a sectional view showing an essential part of a machine tool with a spindle chuck replacing mechanism according to a second embodiment of the present invention.

A second embodiment of the present invention will be described with reference to FIG. 6.

In a machine tool with a spindle chuck replacing mechanism according to the second embodiment, in particular, a spindle motor 4 is movable forward and backward with respect to a spindle support member 2. A casing 12 is fastened to the top of a motor casing for a spindle motor 4. Furthermore, a clutch gear 25 is rotatably supported in the machine tool main body independently of a slide member 31. A fluid pressure cylinder 30 provides driving to displace an input gear 26 relative to the clutch gear 25 in the axial direction. However, the clutch gear 25 and the input gear 26 are configured to maintain a meshed stated. The remaining part of the configuration of the second embodiment is similar to that of the first embodiment, shown in FIGS. 1 to 5.

According to the second embodiment, the front-back driving source 18 couples and decouples the spindle chuck 5 in the processing position P1 to and from the chuck coupling portion 3a of the spindle 3. Moreover, the front-back driving source 18 enables a clutch 24 to be connected and disconnected. In this case, the fluid pressure cylinder 30 may be configured to provide only the function of selectively meshing a driving gear 27 with two driven gears 28, 28. Thus, the thrust of the fluid pressure member 30 can be made smaller than that of the fluid pressure cylinder 30 according to the first embodiment. This enables a reduction in the size of the cylinder. Consequently, the manufacturing costs can be reduced. The second embodiment exerts other effects similar to those of the first embodiment.

Figure 7:
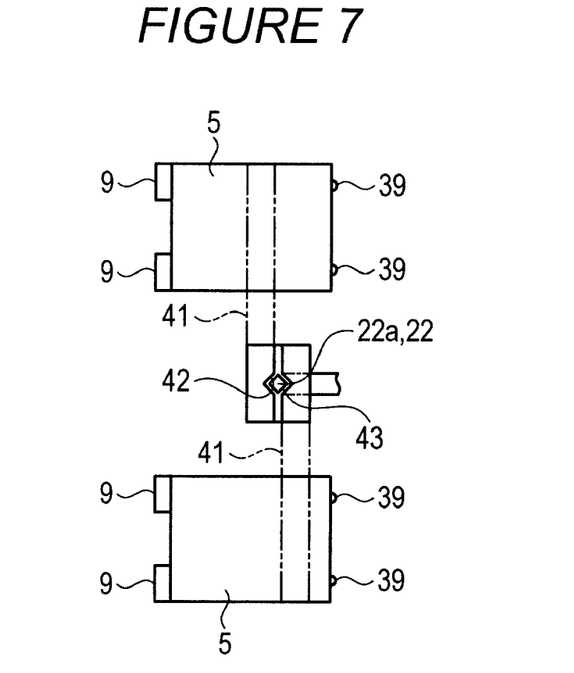
FIG. 7 is a diagram schematically showing an essential part of a machine tool with a spindle chuck replacing mechanism according to a third embodiment of the present invention.

A third embodiment of the present invention will be described with reference to FIG. 7.

In a machine tool with a spindle chuck replacing mechanism according to the third embodiment, a spindle chuck 5 is rotatable via a belt 41 passed around a driving shaft 22. A driving force transmitting portion 22a with a rhomboidal cross section is provided at a tip portion of the driving shaft 22 in the axial direction. Transmission target portions 42, 43 are rotatably supported in a turning portion 8b and are disengageably engageable with a front conical part and a rear conical part of the driving force transmitting portion 22a. A fluid pressure cylinder 30 (see FIG. 6) provides driving to move the driving force transmitting portion 22a forward and backward to enable the driving force transmitting portion 22a to engage selectively with either one of the transmission target portions 42, 43. The remaining part of the configuration of the third embodiment is similar to that of the first or second embodiment. This configuration allows the rotation of a spindle motor 4 to be smoothly transmitted to a chuck coupling portion 3a without the need to take a gear meshing error and the like into account.

In the above-described embodiments, the plurality of spindle chucks 5 are not separately disengaged from the turning arm 8. Another embodiment may include a separating mechanism that enables any of the spindle chucks 5 to be separately disengaged from the turning arm 8, and a work holding mechanism for the spindle chuck 5. This embodiment eliminates the need to improve the rigidity of the spindle chuck 5 compared to the first to third embodiments. Thus, the weight of the spindle chuck can be reduced, and the turnability of the turning arm 8 can be enhanced. Consequently, the size and weight of turning driving motor 19 can be reduced.

Another embodiment may include at least three spindle chucks. A motor and ball screw mechanism is applicable as means alternative to the fluid pressure cylinder 30. In place of the above-described differential gear, an arrangement may be provided in which the clutch 24 is disconnected when the spindle chuck 5 is coupled to the chuck coupling portion 3a of the spindle 3. In this case, the speed difference absorbing mechanism can be implemented using a friction clutch, an electromagnetic clutch, or the like.

Whether or not the spindle chuck 5 is coupled to the chuck coupling portion 3a can be detected and determined by a sensor.

Figure 8:
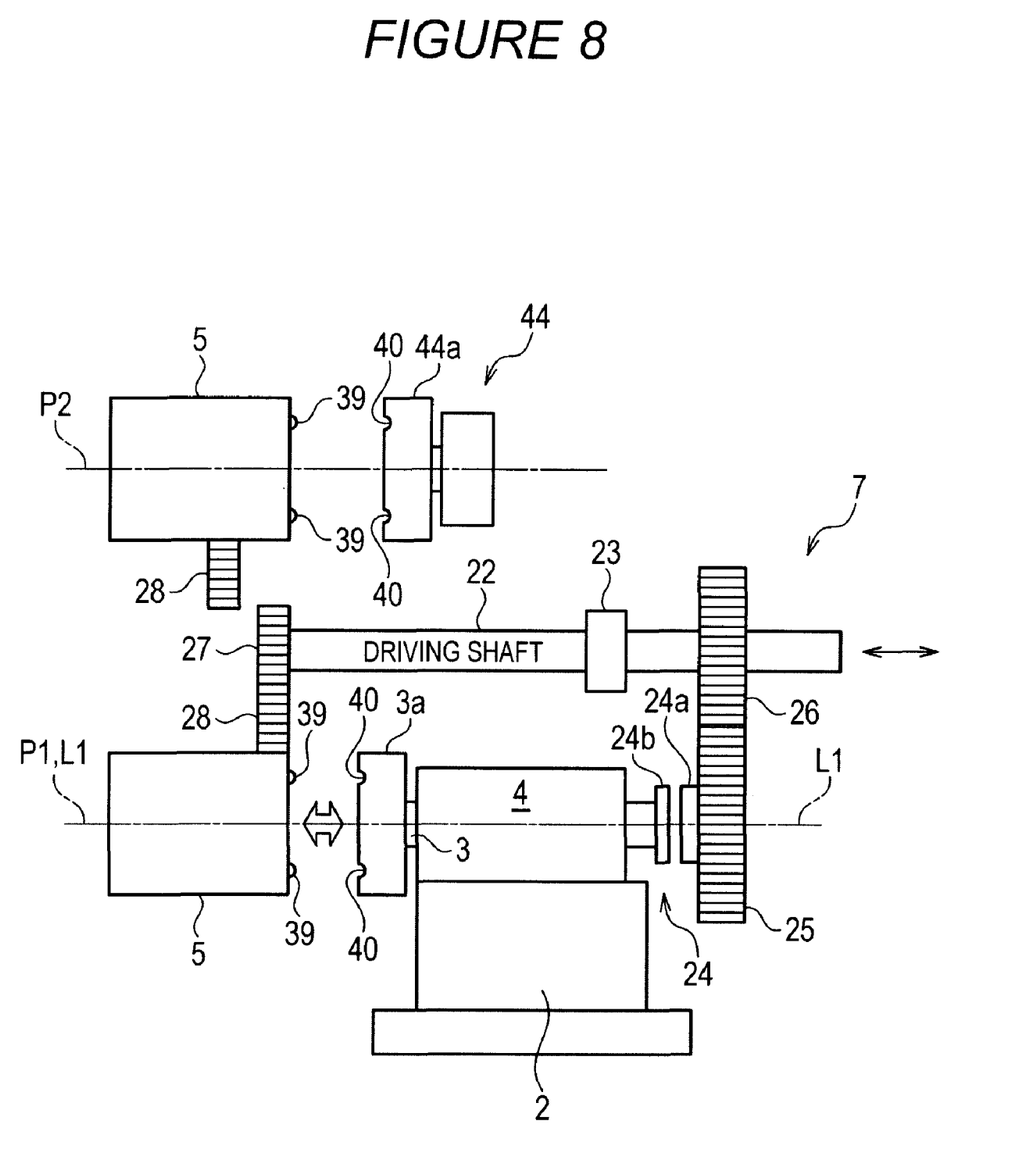
FIG. 8 is a schematic side view of a machine tool with a spindle chuck replacing mechanism according to another embodiment of the present invention.

As shown in FIG. 8, a motor 44 may be provided to rotate the spindle chuck 5 in the work replacement position P1 for air blow or the like. A plurality of the above-described recess portions 40 are formed in a chuck coupling portion 44a of the motor 44 so as to be easily engageable with the plurality of protruding portions 39 of the spindle chuck 5.

Alternatively, the driving gear 27 may be selectively meshed with the two output gears 29, 29. This enables a further reduction in required components.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the scope of the invention.

I claim:

1. A machine tool with a spindle chuck replacing mechanism characterized by comprising:

a spindle having a chuck coupling portion at a tip thereof and rotationally driven by a spindle motor;

a plurality of spindle chucks each capable of holding a work, the spindle chucks being selectively engageable with the chuck coupling portion of the spindle so as to be disengageable from the chuck coupling portion;

a spindle chuck replacing mechanism rotatably supporting the plurality of spindle chucks and freely transferring any one of the spindle chucks between a processing position where the one spindle chuck is positioned in front of the spindle and a work replacement position where the work on the one spindle chuck is replaced with a new one, the spindle chuck replacing mechanism coupling and decoupling the one spindle chuck in the processing position to and from the chuck coupling portion of the spindle; and a pre-rotation-transmission mechanism transmitting rotation of the spindle motor, via a path different from a driving path between the chuck coupling portion of the spindle and the spindle motor, to the one spindle chuck when the one spindle chuck is located in the processing position and not coupled to the chuck coupling portion of the spindle, and in that the pre-rotation-transmission mechanism makes a difference in rotation speed between the one spindle chuck located in the processing position and not coupled to the chuck coupling portion of the spindle and the spindle and has a speed difference absorbing mechanism absorbing the difference in rotation speed with the one spindle chuck when the one spindle chuck is coupled to the chuck coupling portion of the spindle.

2. The machine tool with a spindle chuck replacing mechanism characterized according to claim 1, characterized in that the pre-rotation-transmission mechanism extracts the rotation from a rear part of the spindle.

3. The machine tool with a spindle chuck replacing mechanism characterized according to claim 1, characterized in that the pre-rotation-transmission mechanism has a driving shaft, a driving gear provided on the driving shaft, and a plurality of driven gears each rotatable about an axis and each meshing with the driving gear to transmit rotation to each spindle chuck rotatably supported on the spindle chuck replacing mechanism, and the plurality of driven gears are intentionally misaligned in an axial direction and are selectively meshed with the driving gear by the coupling and decoupling operation of the spindle chuck replacing mechanism.

* * * * *